United States Patent
Simmons

[11] Patent Number: 6,029,331
[45] Date of Patent: Feb. 29, 2000

[54] BRAKE SHOE SPREADER/HOLDER

[76] Inventor: Edward N. Simmons, P.O. Box 708, Mauldin, S.C. 29662

[21] Appl. No.: 09/017,337

[22] Filed: Feb. 2, 1998

[51] Int. Cl.[7] .................................................. B23P 19/04
[52] U.S. Cl. ................. 29/239; 29/256; 29/270; 29/426.6; 254/100
[58] Field of Search ................... 29/426.6, 257, 29/256, 239, 227, 270; 254/100

[56] References Cited

U.S. PATENT DOCUMENTS

| | | |
|---|---|---|
| 1,626,460 | 4/1927 | Goeller . |
| 2,153,941 | 4/1939 | Smith . |
| 3,426,752 | 2/1969 | Laico . |
| 3,540,698 | 11/1970 | McFarland et al. ....................... 29/257 |
| 3,602,973 | 9/1971 | Mata ........................................ 29/227 |
| 3,727,490 | 4/1973 | Diffenderfer et al. ....................... 81/3 |
| 3,835,522 | 9/1974 | Ward ........................................ 29/239 |
| 3,891,185 | 6/1975 | Lett .......................................... 29/227 |
| 4,086,828 | 5/1978 | Mader ......................................... 81/3 |
| 4,768,408 | 9/1988 | Boudjack ................................. 81/485 |
| 4,809,567 | 3/1989 | Bongard ................................... 81/485 |
| 5,018,261 | 5/1991 | Markous ................................. 29/239 |
| 5,095,603 | 3/1992 | Carruthers et al. ...................... 29/227 |
| 5,095,604 | 3/1992 | Baker ....................................... 29/239 |
| 5,165,312 | 11/1992 | Boudjack ................................. 81/485 |
| 5,870,814 | 2/1999 | Herron .................................... 29/239 |

*Primary Examiner*—David P. Bryant
*Attorney, Agent, or Firm*—Henry S. Jaudon; Cort Flint

[57] ABSTRACT

A tool for spreading apart opposed spring biased brake drum shoes adjacent one end to facilitate access to a brake cylinder. The tool includes a pair of fork members having depending prongs mounted on a shaft having screw threads along its length. A first of the fork members is carried in a stationary position relative the length of the shaft while the second of the fork members is carried for driven motion by the screw threads longitudinally of the shaft. In operation the fork members are positioned to be substantially together so that they may be engaged with a projectioning surface of each opposed brake shoe. The shaft is rotated causing the fork members and said brake shoes to be moved in diverging directions a distance sufficient to separate the brake shoes from the cylinder.

7 Claims, 2 Drawing Sheets

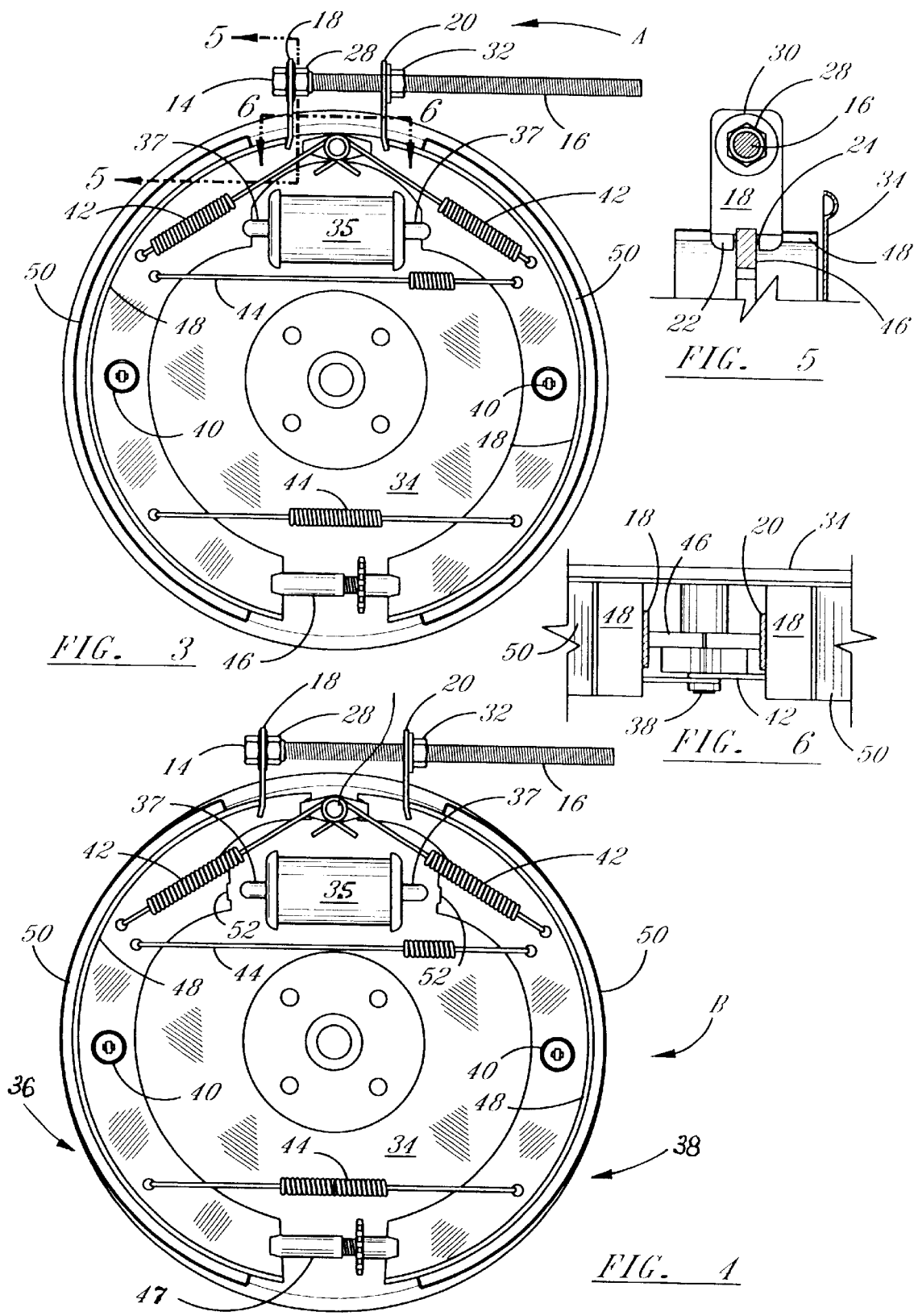

BRAKE SHOE SPREADER/HOLDER

BACKGROUND OF THE INVENTION

The instant invention is directed to a hand tool which operates to separate drum brake shoes which are held in position by springs. The tool acts to separate the shoes a distance sufficient to disconnect them from the brake cylinder while remaining connected with the braking system.

There have been numerous tools produced which are adapted to spread disk brake pads for replacing the pads or for positioning the pads. U.S. Pat. Nos. 3,727,490; 3,835,522; 4,086,828; 4,809,567; and 5,018,261 each show a device designed to separate disk brake calipers.

There also have been hand tools created to engage and separate opposed drum brake shoes in order to free the automatically adjustable spacer. These tools comprise straight arms pivotally connected and adapted to engage and wedge apart opposed ends of the drum brake shoes. U.S. Pat. Nos. 4,768,408 and 5,165,312 show embodiments of their type of hand tools.

The present invention has, as an object, the method of separating opposed and spring biased drum brake shoes from engagement with a brake cylinder while maintaining the shoes in a biased connection with the brake system. The method includes providing a spreading tool having a pair of depending forks which are arranged to move relative to each other along a longitudinal shaft and positioning the forks in substantially adjacent relation. Engaging end portions of each of the opposed brake shoes with a respective of the forks and causing the forks and engaged brake shoes to move in diverging directions a distance along the shaft sufficient to separate the brake shoes from the brake cylinder.

The invention further has for its object a tool operable to separate spring biased drum brake shoes from a brake cylinder while maintaining the brake shoes in spring biased connection in a brake system. The tool includes a threaded bolt having a head at one end, a bearing formed adjacent the head, a first fork having downwardly depending prongs mounted with the bearing for rotation about the bolt in fixed longitudinal relation with the bolt, and a second fork having downwardly depending prongs mounted in mating contact with the threads of the bolt for longitudinal movement there along. Each fork is outwardly bowed, and is approximately 2" in length, 1" in width and 7/64" in thickness. The prongs are at least ¼" long and are spaced by at least 15/32". The bolt includes a ⅜" threaded rod which is between 8" and 12" long.

The bearing is defined by the head and a lock nut longitudinally spaced from the head in fixed position on the bolt. A pair of washers may be positioned separate the first fork from the head and nut.

The second fork includes an aperture and a threaded nut aligned with the aperture and fixed with the fork. The threads of the nut mate with the threads of the bolt.

The two brake shoes of the brake system are arranged in opposed relationship. Each brake shoe is structured to include a spine and a pad support surface. The prongs of each fork are designed to extend along opposite sides of the spine of each brake shoe in position to engage with an edge of the pad support surface. Diverging movement of the forks moves the brake shoes outwardly and away from the cylinder. This movement is done without disconnecting the spring biased connection which maintains the brake shoes within the braking system.

The primary object of the present invention is to provide a tool which facilitates replacement or repair of the brake cylinder with a time saving of at least on hour.

Another object of the invention is the provision of a tool which provides access to the brake cylinder of a drum brake system without disconnecting the brake shoes and their retaining springs.

Another object of the invention is a tool which operates to separate drum brake shoes from the brake cylinder.

Another object of the invention is the provision of a spreading tool which may be connected with a power tool to be driven thereby.

Another object of the invention is a drum brake shoe spreader tool which is capable of functioning with substantially all known types of drum brake systems of automobiles, trucks, trailers, etc.

SUMMARY OF THE INVENTION

The present invention has, as an object, the method of separating opposed and spring biased drum brake shoes from engagement with a brake cylinder while maintaining the shoes in a biased connection with the brake system. The method includes providing a spreading tool having a pair of depending forks which are arranged to move relative to each other along a longitudinal shaft and positioning the forks in substantially adjacent relation. Engaging end portions of each of the opposed brake shoes with a respective of the forks and causing the forks and engaged brake shoes to move in diverging directions a distance along the shaft sufficient to separate the brake shoes from the brake cylinder.

The invention further has for its object a tool operable to separate spring biased drum brake shoes from a brake cylinder while maintaining the brake shoes in spring biased connection in a brake system. The tool includes a threaded bolt having a head at one end, a bearing formed adjacent the head, a first fork having downwardly depending prongs mounted with the bearing for rotation about the bolt in fixed longitudinal relation with the bolt, and a second fork having downwardly depending prongs mounted in mating contact with the threads of the bolt for longitudinal movement there along. Each fork is outwardly bowed, and is approximately 2" in length, 1" in width and 7/64" in thickness. The prongs are at least ¼" long and are spaced by at least 15/32". The bolt includes a ⅜" threaded rod which is at least 8" long and up to 12" in length.

The bearing is defined by the head and a lock nut longitudinally spaced from the head in fixed position on the bolt. A pair of washers may be positioned separate the first fork from the head and nut.

The second fork includes an aperture and a threaded nut aligned with the aperture and fixed with the fork. The threads of the nut mate with the threads of the bolt.

The brake shoes of the brake system are arranged in opposed relationship. Each brake shoe is structured to include a spine and a pad support surface. The prongs of each fork are designed to be along opposite sides of the spine of each brake shoe in position to engage with an end of the pad support surface. Diverging movement of the forks moves the brake shoes outwardly and away from the cylinder. This movement is done without disconnecting the spring biased connection which maintains the brake shoes within the braking system.

DESCRIPTION OF THE DRAWINGS

FIG. 3 is a cutaway side view of a drum brake braking system with the tool positioned to separate the brake shoes.

FIG. 4 is a cutaway side view similar to FIG. 3 with the brake shoes separated from the cylinder.

FIG. 5 is an exploded cutaway taken along lines 5—5 of FIG. 3.

FIG. 6 is an exploded cutaway taken along lines 6—6 of FIG. 3.

DESCRIPTION OF A PREFERRED EMBODIMENT

Figure 1:
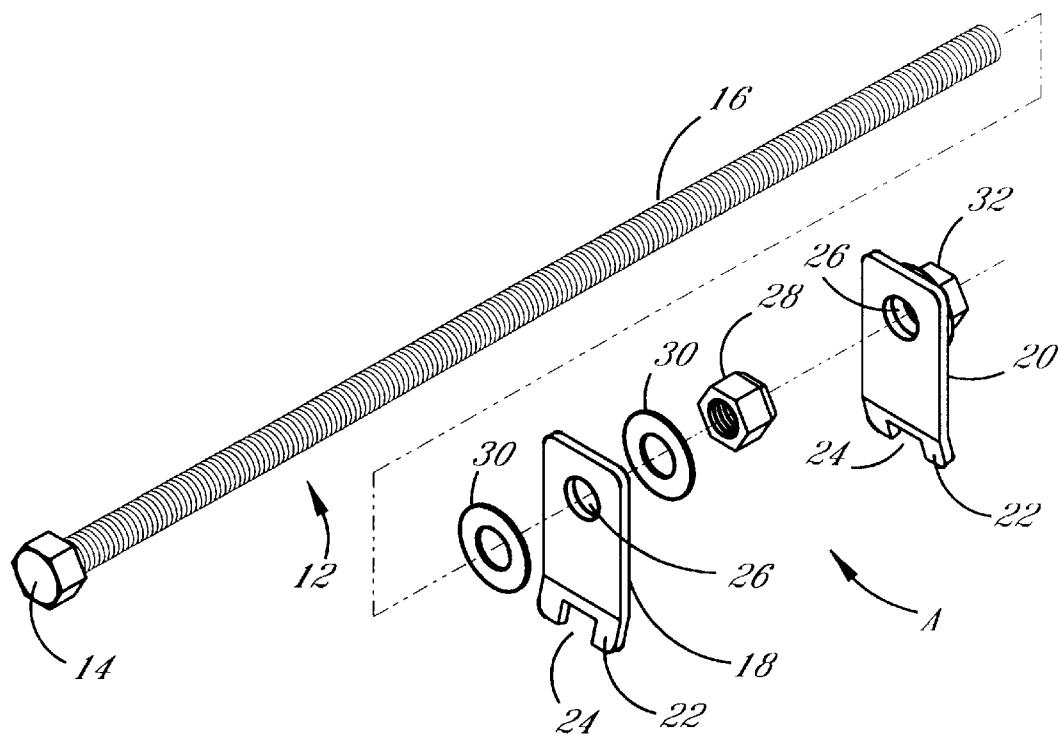
FIG. 1 is an exploded perspective view of the tool of the invention.
Figure 2:
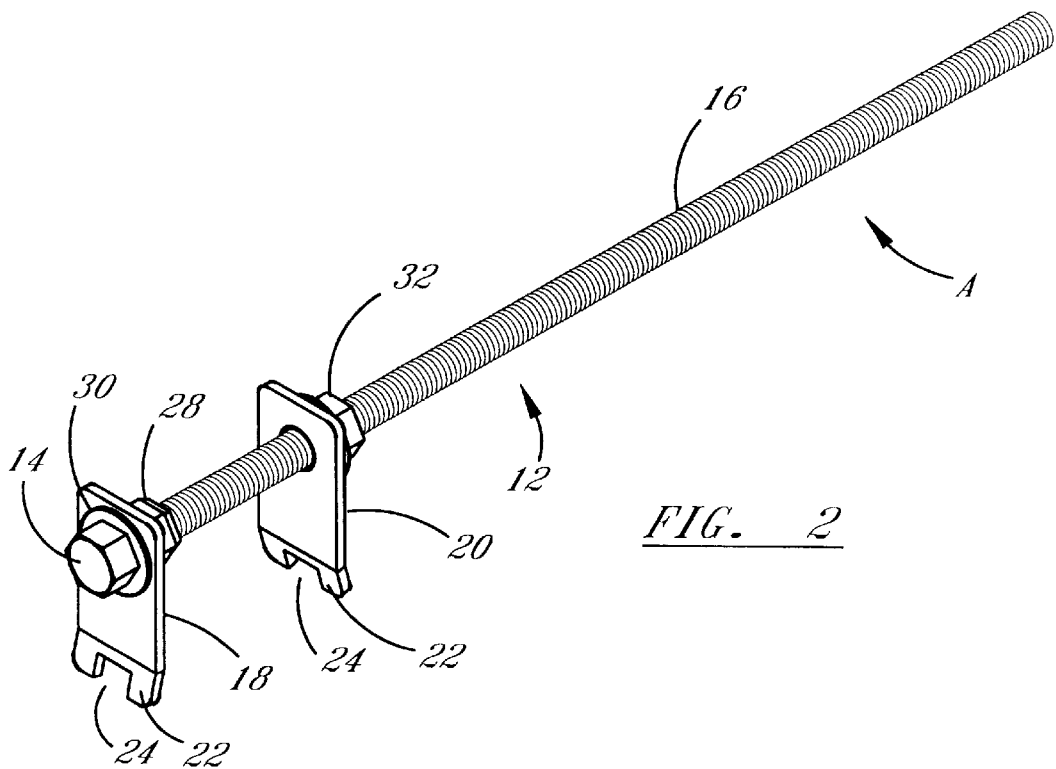
FIG. 2 is a perspective view of the tool of FIG. 1.

Turning now to the drawings, FIGS. 1 and 2 show the spacer tool of the invention in detail.

Spacer tool A includes a longitudinal shaft which consists of bolt 12 having a hexagonal head 14 and a ⅜" coarse threaded rod 16 which is between 8" and 12" long. It is necessary that rod 16 be at least 8" long in order that tool A be capable of operating with most known types of drum brake systems.

A pair of forks, shown as 18 and 20 are mounted on rod 16 of bolt 12 by way of aperture 26. Each fork is constructed of sheet steel formed to be approximately 2" in length, 1" in width and 7/64" thick. Prongs 22 are spaced by 15/32" and are approximately ¼" in length. There is a ⅜" bore formed in the upper end of each fork at about ½" from its top surface. Each fork is shaped with an outward bend of about 20°. These sizes and configurations are those which have been determined to be the most desirable for universal use. Obviously these sizes and configurations may be altered to be slightly larger or smaller in order to better accommodate specific brake structures.

As shown in FIGS. 2, fork 18 is mounted on rod 16 adjacent to nut 14. A ⅜" lock nut 28 is secured with rod 16 to fix fork 18 against longitudinal movement. A pair of washers 30 may be provided between the fork, the head, and the nut. This arrangement forms a bearing mounting between the rod and the fork.

Fork 20 has threaded nut 32 secured with its outer surface in alignment with aperture 26. The threads of nut 32 are sized to mate with the threads of rod 16.

Fork 20 when positioned on rod 16 may be driven longitudinally of bolt 12 by nut 32.

Turning now to FIGS. 3 through 6, a conventional drum brake system is shown at B. System B includes housing 34 carrying cylinder 35 and pin 39. A pair of drum brake shoes 36, 38 are connected with housing 34 by spring clips 40 and are biased into engagement with pin 39 at their upper ends by springs 42 and springs 44. The opposite ends of brake shoes 36 and 38 are biased into engagement with automatic adjuster 47 by springs 44. Because of the numerous biasing springs, this unit is very difficult and time consuming to assemble. Assembly can require the purchase and use of special tools.

Each brake shoe 36, 38 consists of a spine 46 which mounts a pad support surface 48 carrying pad 50. Notches arranged on outer ends of adjuster 47, engages with spines 46 at the lower ends of brake shoes 36, 38. A notch 52 is formed in an outer surface of spine 46 and arranged to engage with rods 37 of cylinder 35. In operation, braking is caused by cylinder 35 forcing rods 37 outwardly which in turn pivots shoes 36, 38 away from pin 38 about adjuster 47 and against the brake drum.

In order to replace or repair cylinder 35, shoes 36, 38 must be disengaged from rods 37 of cylinder 35. Normally this requires disassembly of the entire braking system.

In use, spreader A is adjusted to position, forks 18 and 20 to be substantially adjacent each other or at a distance sufficient to allow access between the outer edges of pad support surfaces 48 of opposed brake shoes 36, 38. Spine 46 is positioned in space 24 with projections 22 extending along each side thereof and below pad support surface 48. Bolt 12 is rotated in a direction to move fork 20 longitudinally away from fork 18. Prongs 22 engage the edges of pad support surfaces 48 on each side of spline 46 and drive brake shoes 36, 38 in an outward direction causing them to pivot about adjuster 47 a distance sufficient to separate notches 52 from rods 37. With brake shoes 36, 38 separated from cylinder 35, the cylinder may be accessed for repair or replacement without disturbing the mounting and tensioning system for the brake shoes. When cylinder 35 is repaired or replaced, bolt 12 is rotated in the opposite direction moving forks 18, 20 in a converging direction which allows brake shoes 36, 38 to re-engage rods 37. Tool A is then removed and the brake repair is complete.

It is noted that forks 18, 20 are curved outwardly to insure that engagement with the brake shoe is secure.

It is also noted that certain brake systems include projecting surfaces or configurations on the spine nearer the end portions which rest against pin 38. Forks 18 and 20 which may be engaged with these projecting surfaces when positioned to separate the brake shoes.

While a preferred embodiment of the invention has been described using specific terms, such description is for illustrative purposes only, and it is to be understood that changes and variations may be made without departing from the spirit or scope of the following claims.

What is claimed is:

1. A drum brake shoe spreading hand tool for spreading apart upper ends of a pair of brake shoes of the type used in brake drum assemblies having a housing carrying a pin and a brake cylinder in adjacent positions with each of the brake shoes being urged at said upper end into contact with said pin and said brake cylinder and into contact at a second lower end with an adjusting member by tensioning members, said tool comprising:

a pair of fork members each having a pair of depending prongs;

a shaft having screw threads along its length carrying a first of said fork members in a stationary position and a second of said fork members for driven motion by said screw threads longitudinally of said shaft; whereby, said prongs of said fork members, when positioned to be substantially adjacent each other may be inserted on opposite sides of said pin and into engagement with said upper ends of said brake shoes, said shaft may be rotated to move said fork members and said upper ends of said brake shoes in diverging directions a distance sufficient to spread and separate said upper ends of said brake shoes from said pin and said brake cylinder, freeing said brake cylinder for repair while maintaining said tensioning members, adjustment member and brake shoes interconnected within said housing.

2. The hand tool of claim 1 wherein said shaft comprises a ⅜" threaded bolt having a head and being at least 8" long, said head being driven to rotate said bolt.

3. The hand tool of claim 1 wherein said fork members are bent outwardly at approximately 20°.

4. The hand tool of claim 1 wherein said prongs are approximately ¼" in length and are spaced by approximately 15/32".

5. The hand tool of claim 4 wherein said fork members are about 2" in length, 1" in width and 7/64" thick.

6. A tool for separating opposed upper ends of spring biased drum brake shoes in an assembled drum brake system from a brake cylinder comprising:
- a threaded bolt having a longitudinal axis and a head at one end;
- a bearing formed adjacent said head;
- a first fork having a thickness of about 7/64" extending along said longitudinal axis mounted with said bolt adjacent one edge surface;
- a second fork having a thickness of about 7/64" extending along said longitudinal axis and a threaded opening adjacent one edge surface mounted in mating contact with said threads of said bolt;
- said first and second forks each having transversely spaced prongs extending from a second edge surface; whereby,
- said prongs may be inserted between and in spaced contact with each of said opposed upper ends of said brake shoes in said assembled brake system with said forks in an adjacent position and said forks may be separated into a second spaced position causing said prongs to separate said upper ends of said brake shoes from said brake cylinder while the remainder of said brake cylinder remains assembled.

7. The hand tool of claim 6 wherein each of said brake shoes include a pad support surface and a spline, said prongs being spaced sufficiently to engage with said pad support surfaces on opposed sides of said spline.

* * * * *